US000001131H

United States Statutory Invention Registration [19]

[11] Reg. Number: H1131

Wolski et al.

[43] Published: Jan. 5, 1993

[54] INTEGRATED SAFE AND ARM APPARATUS

[75] Inventors: Raymond Wolski, New Britain, Conn.; Larry McConnell, Hopatcong, N.J.

[73] Assignee: The United States of America as represented by the Secretary of the Army, Washington, D.C.

[21] Appl. No.: 888,695

[22] Filed: May 7, 1992

[51] Int. Cl.[5] ..... F42C 15/00

[52] U.S. Cl. ..... 102/221

*Primary Examiner*—David H. Brown

*Attorney, Agent, or Firm*—Anthony T. Lane; Edward Goldberg; Michael Sachs

[57] ABSTRACT

An integrated Safe-Arm Device is an electrically activated, dual environment sensing mechanism which aligns a ball valve from a vented safe mode to a connected gas mode by sensing minimum sustained missile launch acceleration and minimum missile arming altitude prior to removing and setting various locks on the piston valve arming mechanism. The safing features have no stored energy and require the energy extracted from the environments to operate.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRATED SAFE AND ARM APPARATUS

GOVERNMENTAL INTEREST

The invention described herein was made in the course of a contract with the Government and may be manufactured, used and licensed by or for the Government for Governmental purposes without the payment to us for any royalties thereon.

BACKGROUND OF THE INVENTION

The introduction of ballistic missiles having improved lethality which can cause widespread destruction over large areas has necessitated the need for fail safe measures to assure the reliability of the missile under a variety of conditions.

In the past missile safe and arm devices have usually incorporated one or more environmental sensors which were directly coupled to the output "arming" sections of the missile. These prior art safe-arm devices included unbalanced acceleration sensitive in-line or out-of-line detonator rotors, linear in-line or out-of-line detonator weights and other typical systems. The prior art systems were unsatisfactory because they did not satisfy the newer more stringent guidelines for elimination of an inadvertent or premature operation of the safe and arm output when the missile was exposed to abnormal environments.

The present invention improves the improbability of inadvertent or premature operation of the safe and arm output with minimum complication to the required existing hardware.

SUMMARY OF THE INVENTION

The present invention relates to an Integrated Safe and Arm Device (ISAD) for a missile system which requires extraordinary safety features. A "missing link" concept is used to improve the basic safety capability in a safe and arm device when the missile is subjected to abnormal environments. The "missing link" structure physically isolates the output (arming) section of the missile from the input sensing section of the safe and arm device until all arming criteria is accomplished. Once the arming criteria has been completed, the "missing link" is engaged, connecting sensing drivers to the output section, thereby allowing arming to occur. The ISAD is an electrically activated, dual environment sensing mechanism which ultimately aligns a ball value from a vented (atmospheric safe) mode to a connected gas (armed) mode. Environmentally sealed, the device senses minimum sustained missile launch acceleration and arming altitude prior to removing and setting various locks on a piston valve arming mechanism.

An object of the present invention is to provide a significant increase in missile safety without comprising missile reliability.

Another object of the present invention is to provide an integrated safing and arming device having enhanced basic safety capability when the missile is subjected to abnormal environments.

Another object of the present invention is to provide a safe arming device which physically isolates the output (arming) section from the input (sensing) section of the safe and arming device until all arming criteria has been met.

Another object of the present invention is to provide a safe and arm device which utilizes precise sequence of electrical and environmental activated events of proper magnitude to determine whether or not a physical coupling to and an eventual activation of an ultimate output element will be permitted.

A further object of the present invention is to provide a missing link device which insures that no stored or developed arming energy can influence the ultimate system output until all pre-determined safety criteria have been satisfactorily met.

For a better understanding of the present invention, together with other and further objects thereof, reference is made to the following description taken in connection with the accompanying drawings.

BRIEF DESCRIPTION OF THE DRAWINGS

Throughout the following description like reference numerals are used to denote like arts of the drawings.

Description of the Preferred Embodiment

Figure 1:
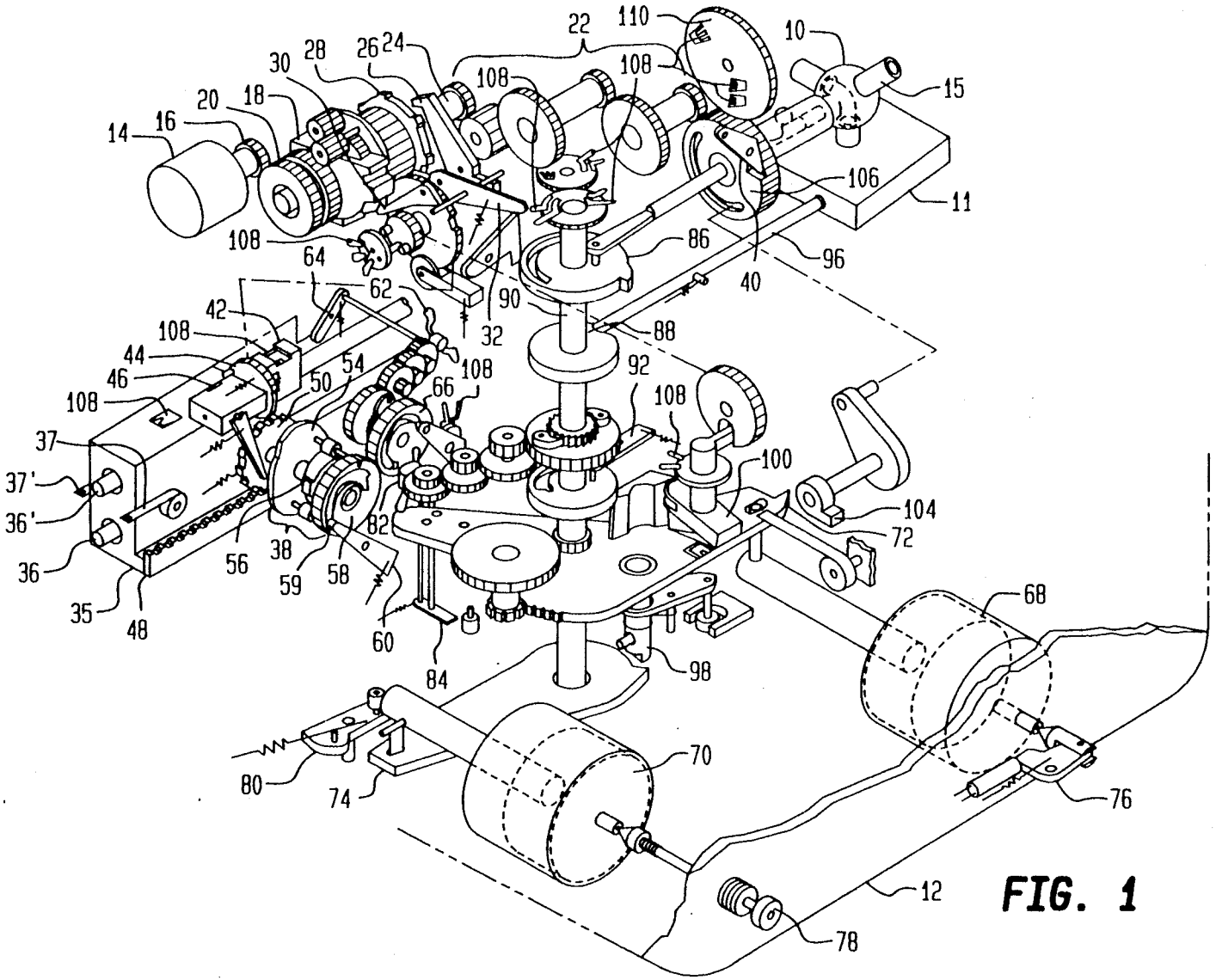
FIG. 1 is an isometric functional drawing of the missing link integrated safe and arm device (ISAD).
Figure 5:
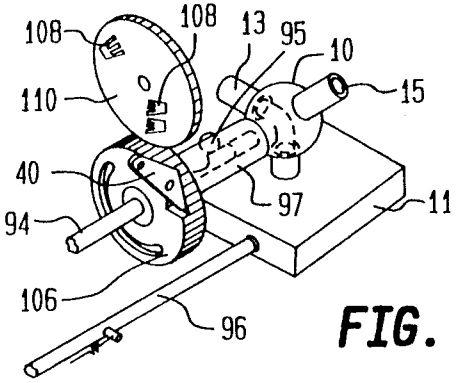
FIG. 5 is an isometric functional sectional drawing of a ball valve and gas generator of the ISAD.

Referring now to FIGS. 1 and 5 the ISAD is an electrically activated, dual environment sensing mechanism which ultimately aligns a ball valve 10 from a vented (atmospheric) "safe" mode to a connected (gas) "armed" mode. The ISAD valve 10 is a three way, two position internal pressure sealed valve. In the "safe" position the valve is ported from the gas generator output 11 to the valve vent port 13. In the "armed" condition, the output from the gas generator 11 is ported to a turbo alternators, not shown, via a turbo alternator port 15 to provide for warhead power.

The ISAD is environmentally sealed within housing 12, senses minimum sustained missile launch acceleration and minimum missile arming altitude prior to removing and setting various locks, to be described hereinafter, on the piston valve arming section shown in FIG. 4. The ISAD has the capability of being reset without disassembly.

Figure 2:
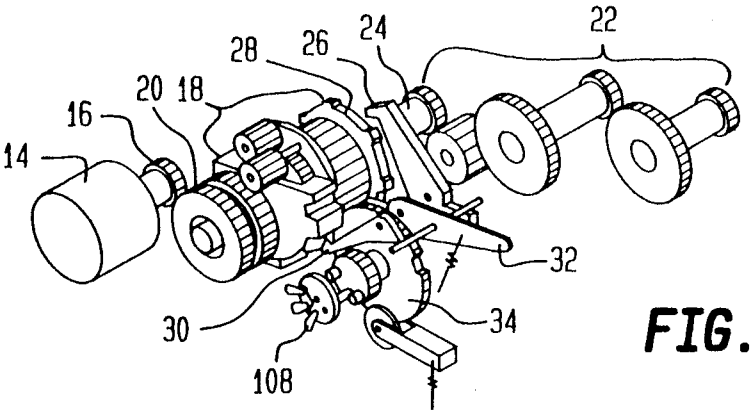
FIG. 2 is an isometric functional sectional drawing of a motor and gear block of the ISAD.

Referring now to FIGS. 1 and 2 the motor and gear block section of FIG. 2 includes a D.C. torque motor 14 having an output pinion gear 16 mechanically coupled to a differential assembly 18 through a clutch assembly 20. A valve gear train 22 is mechanically coupled to the differential carrier shaft 24. The housing 12 pivotally supports a transportation brake lever 26 which is rotatably in alignment with differential free wheeling output gear 28 of the differential 18 and a valve brake lever 30 which is also rotatably in alignment with the differential 18. The power gear train 22 is engaged to the ball valve 10 via a missing link lever 32. A detented output spur gear 34 meshes with the differential free wheeling gear 28.

Figure 3:
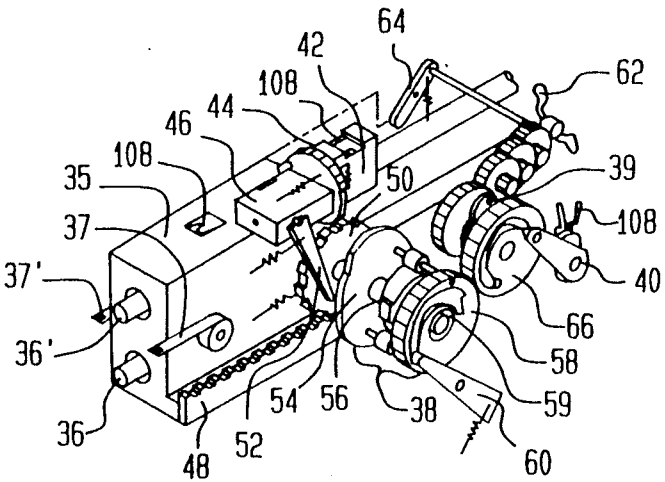
FIG. 3 is an isometric functional propulsion sectional drawing of the ISAD.

Referring now to FIGS. 1 and 3, the propulsion sensor and timer section of FIG. 3 has an acceleration sensitive g-weight 35 which rides on parallel rail 36, 36' and responds to boost acceleration of 4 g or greater by extending bias springs 37, 37'. After 10 continuous seconds at 4 g or greater, the bias spring 37, 37' are locked in an extended position. The translation of the g weight 35 to its full stroke position stores energy in the drive assembly 38. The drive spring assembly 38 is coupled through an escapement 39 to one of two valve locks 40 on the gas generator ball valve 10. All of the energy to operate the propulsion section is derived from the boost environment. If the acceleration level drops below 4 g before 10 seconds have elapsed, the bias spring 37, 37′ retract and the g weight mechanism 35 returns to the initial condition under the influence of bias springs 37, 37′. A first rotatably spring biased transportation lock 42 is connected by first transportation lock gear 44 to intermediate gear 34. A second commit lock 46 is released if acceleration is sustained for 10 seconds, preventing the g weight 35 from returning to its original position. When the "g" weight 35 is set back on missile launch, rack 48 rotates a biased pinion 50 which is connected by shaft to the drive spring assembly 38. Drive spring assembly 38 includes a spring biased commit lever 52 and cam 54 which interfaces with the second commit lock 46 on one end and a commit lever cam 54 on its other end, a drive spring 56 for rotating cam 54, and a timer output cam 58. A biased velocity discriminator lever 60 rotatably interfaces with the timer output cam 58. During the transition to the fully energized condition, drive rotation of the drive spring assembly 38 is prevented by the first valve lock lever 40 on a 60 second timer 62. The complete stroke of the g weight 35 releases a biased time start lever 64 enabling the 60 second timer 62. The energy stored in the drive spring assembly 38 is released and regulated by the 60 second timer 62. The timer output cam 58 is connected to the timer 62 escapement by means of a propulsion safe and arm device (PSAD) output cam 66.

Figure 4:
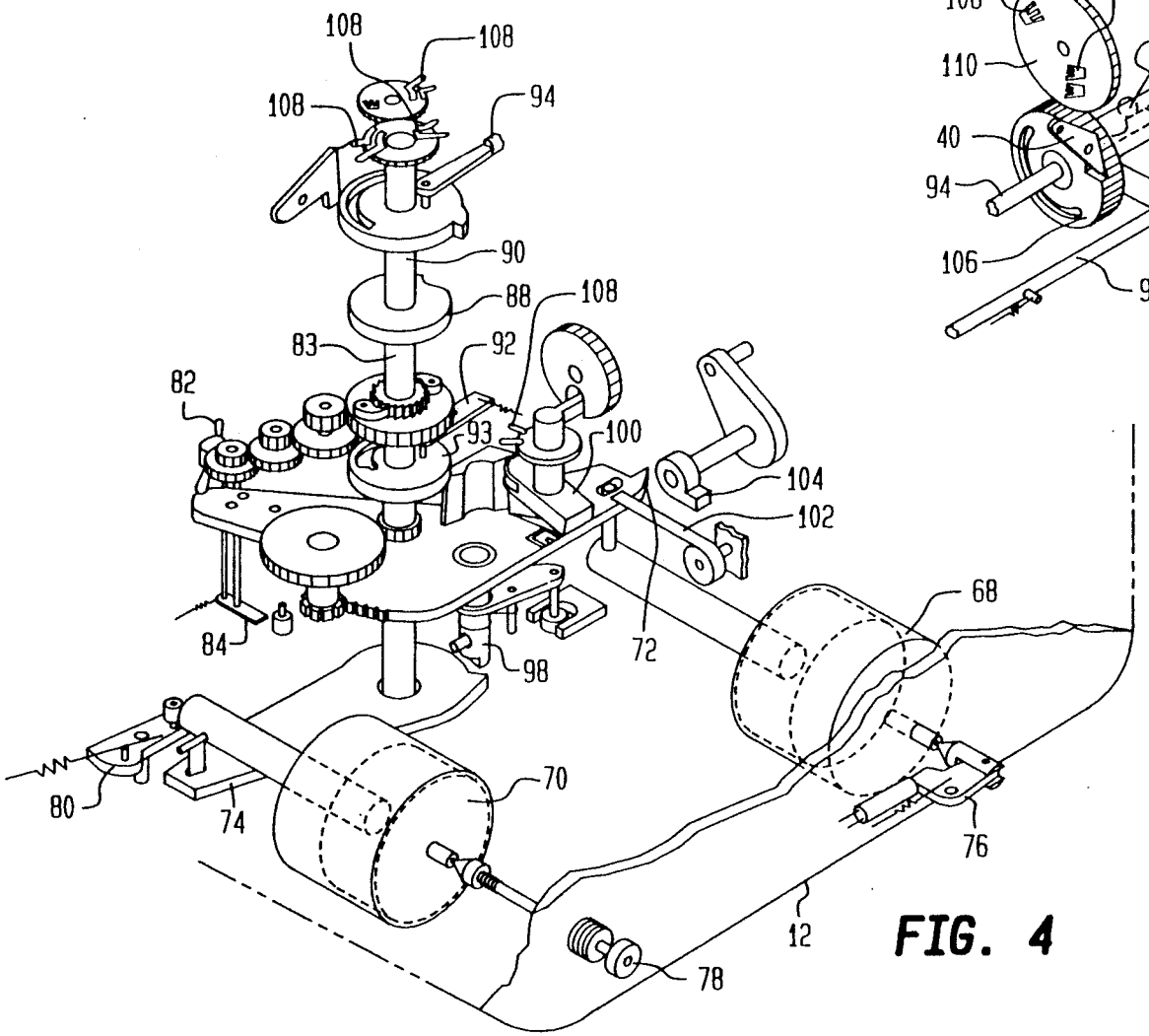
FIG. 4 is an isometric functional sectional drawing of an exoatmospheric sensor of the ISAD.

Referring now to FIGS. 1 and 4. The exoatmospheric section assembly comprises two pistons 68 and 70 sealed by a rolling diaphragm not shown. The atmospheric reference drive piston 68 and the vacuum reference drive piston 70 are connected to each other by an atmospheric drive arm 72 and a vacuum drive arm 74 respectively. The exoatmospheric section is a pressure sensitive mechanism designed to monitor a reentry vehicle for sustained exoatmospheric flight. The exoatmospheric section employs preactivated no stored arming energy concept. The mechanism utilizes environmentally derived energy to sense a specific pressure valve and to drive a time based control mechanism that terminate with mechanical outputs required to unlock the pneumatic control valve 10 and connect the output of the DC torque motor 14 to the valve drive train 22. The atmospheric drive piston 68 is vented to the atmosphere by means of a solenoid biased port seal mechanism 76. The vacuum drive piston is vented by a spring closed manual reset vent 78 and vacuum piston biased reset lever 80. The atmospheric drive arm mechanism includes the drive arm 72, a mechanical timer 82 assembly operatively positioned on drive arm 72, a biased timer release lever 84 pivotably in contact with the timer 82, a pair of exoatmospheric safe and arm device (ESAD) output cams 86 and 88 fixedly supported on timer output shaft 90, a biased velocity discriminator member 92 is operatively mounted on an exoatmospheric drive arm shaft 90, a control valve shaft unlock pin 94 is operatively supported on first ESAD output cam 86, and includes a shaft lock ball 95, a gas generator interference pin 96 is biasedly held in contact with the second ESAD output cam 88, a biased drive arm safety lock 98 rotatably contacts one end of the vacuum drive arm 74, a transportation lock member 100 rotatably interfaces with the atmospheric drive arm 72, an atmosphere reference spring 102 provides a bias for the atmospheric drive arm 72, a commit lock member 104 rotatably interfaces with atmospheric drive arm 72 and main valve drive gear 106, and electrical monitor switches 108 are provided to indicate the positional status of the valve section of FIG. 5, the exoatmospheric section of FIG. 4 and the propulsion section of FIG. 3.

In operation, before launch transportation locks 42 and 100 are in a safe position. The "g" weight 35 and the atmospheric drive arm 72 are secured in this safe position. Since all other motion and operational power is related to the movement of these two elements, the device is locked "SAFE". With 28 VDC electrical power remotely applied to the torque motor 14, counter clockwise rotation of motor 14 removes the transportation lock 42 on the g weight 35 and the lock member 100 on the atmospheric drive arm 72. The drive mechanism of FIG. 2 makes use of geared differential 18 as a transmission which provides a convenient method to obtain two possible outputs (transportation locks and valve drive) by simply locking out one or the other output members. In the clear transportation locks mode, the valve drive output shaft 24 is locked out because of the reflected torque requirement of the gas ball valve 10 and its 184 to 1 gear train 22. As a result, motor torque rotates the detented intermediate gear 34 through a 3.6 to 1 gear reduction. The function of intermediate gear 34 is to remove the system transportation locks 42 and 100 out of engagment with the differential gear 28, the intermediate gear 34 is partially detented in the "unlock" position. The intermediate gear 34 is spring loaded to return by the transportation locks 42 and 100 and ratchets in contact with the differential gear 28.

During missile launch, at lift-off, the missile, not shown, experiences normal launch acceleration which exceeds 4 g at one second into the flight. Normally this acceleration is sustained for approximately 35 seconds. Upon sensing the 4 g acceleration the g-weight 35 traverses, or "sets back " to the full "arm" position, stroking a distance of 1.7 inches, working against the force of a pair of constant force bias springs 37, 37′ and a constant torque clock drive spring 56. At this position a pin, not shown in the drawings, protruding from the g-weight 35 releases the timer start lever 64, to remove a block on the time escapement 62. With the timer spring wound, the timer blocking lever released, the 60 second timer 62 is now free to run.

At missile lift-off plus ten seconds, assuming sustained acceleration, the timer output shaft and cam 58 and 66 are rotated for 10 seconds at a controlled rate. The 10-second commit lever 52 is dropped off of its hold-off cam 54, removing its block on the propulsion commit lock 46.

The spring loaded commit lock 46 rotates behind the setback g-weight 35 to lock the g-weight in the "armed" position and allows the timer 62 to complete its cycle regardless of continued acceleration.

At the completion of timer 62 run-out (To −60 seconds) the timer outputs cams 58 and 66 have rotated to their final position, the first valve lock lever 40 rotates out of engagement with the main valve drive gear 106, and the first lock on the ball valve 10 is removed. The velocity discriminator lever 60 is spring loaded to follow the cam 58 profiles of the control plate 59. When the control plate 59 rotates at the specified rate, the discriminator lever 60 will remain in the cam profile that permits full rotation of the timer 62 output shaft.

At missile launch plus 80,000 feet, although FIGS. 1 and 4 do not show piston movement, the atmospheric drive piston 68 has been responding to diminishing air pressure associated with increasing altitude. At an altitude of greater than 60,000 feet the atmospheric drive piston 68, working against the force balance of the vacuum reference piston 70, has traversed its full stroke. On attaining the full stroke position, the exoatmospheric timer start lever 84 is rotated out of locked engagement with the timer escapement 82 allowing the timer to start its timing cycle. The exoatmospheric sensor of FIG. 4 consists basically of a two piece balanced beam supporting a rolling diaphragm (not shown) piston on either end, piston 68 is ported to the atmosphere by means of port seal 76 and the other piston 70 acts in a vacuum reference environment such that the two pistons are in equal force balance during altitude ascent. At the critical activating altitude, 80,000 feet (60,000 minimum), the timer start lever 84 is actuated, allowing the vacuum reference piston 70 and arm to provide a drive torque to the timer 82. With the timer 82 mounted on and as part of the atmospheric reference piston arm 72, the relative vacuum pressure in the reference piston 70 provides the necessary drive power reacting against the atmospheric piston 68. The timer output shaft 90 and output cams 86 and 88 start to rotate at a controlled rate. The drive arm safety lock 98 rotates out of its interference position with the vacuum reference arm 74.

At missile launch plus 80,000 feet plus 360 seconds the timer exoatmospheric output cams 86 and 88, driven by the vacuum reference piston arm 74, rotate to complete their timing cycle at 360 seconds. Three output functions have occurred at this time:

1. The missing links lever 32 is driven into engagement with the differential output gear 28 to transport the drive power to the ball valve section of FIGS. 5.

2. The valve shaft ball lock 95 is released by unlocking pin 94 to remove its lock on the valve shaft 97.

3. The gas generator interference pin 96 enters the gas generator 11 preventing its removal from the valve 10. This prevents the gas generator 11 from being mounted to the valve 10 if the ISAD is in the armed move. The exoatmospheric timer velocity discriminator 92 follows the normal cam surface of timer cam 93 allowing full rotation of the timer output shaft.

With completion of the environmental sensing and completion of removal of all safety locks on the valve 10, the valve 10 is now free to be operated. A remote 28 VDC is applied to energize the torque drive motor 14. Driving through the gear train 22, the generated motor torque rotates the ball valve 10 and switches it to the full armed position. As the valve 10 is rotated from the Safe to the Armed position, commit lock 104 is rotated into the exoatmospheric sensor piston arm 72, preventing the arm from returning to a safe position. The valve 10 is now directly ported to the gas generator 11 and external gas lines, not shown. In the safe mode the valve 10 had been ported to the atmosphere. Proper alignment of valve 10 in the armed mode, results in igniter switch closures, not shown, that permits the application of a remotely applied electrical signal to the gas generator 11. The initiated gas generator 11 provides an adequate gas supply for approximately 65 seconds at the required horsepower. Electrical monitor swatches 108 provide the positional status of the valve 10, the exoatmospheric and propulsion systems of FIG. 4 and FIG. 3 respectively.

Resetting the valve 10 simply requires applying 28 VDC of the opposite polarity to reverse the motor 10 rotation, and to cause the valve 10 to be driven to the safe position. When the valve has completed its return stroke, a monitor switch 108 on gear 110 indicates this position and power to the motor is removed. In rotating to the safe position, the valve 10 rotates the exoatmospheric commit lock 104 out of engagement with the atmospheric sensor arm 72. At the completion of the reset cycle the g-weight 35 is returned to its safe position, and the valve lock 40 is completely resafed, the 10 second commit timer output cam 58 is in the time-zero position, and the spring loaded transportation lock 42 is returned to its interference position with the g-weight 35. The ISAD is now in full reset position.

While a specific embodiment of the invention has been shown and described in detail to illustrate the application of the principles of the invention, it will be understood that the invention may be embodied otherwise without departing from such principles.

What is claimed is:

1. An integrated safe and arm device (ISAD) for a missile which comprises:

a housing for hermetically sealing said ISAD there within and for providing a controlled atmosphere therefor;

exoatmospheric pressure sensor means operatively disposed in said housing for monitoring the reentry of said missile for sustained exoatmospheric flight;

propulsion sensor means operatively connected to said exatmospheric means for monitoring the performance of said missile during the powered flight portion of said missile's trajectory;

generator means for generating gas;

pneumatic control valve means operatively disposed external to said housing for directing gas from said generator means to a safety valve vent when said control valve means is in a safe position and to a turbo alternator port when said valve means is in an armed position;

motor and gear blocks assembly means operatively coupled to said propulsion sensor means and said exoatmospheric means for providing the mechanical force needed to lock and unlock said pressure and propulsion sensor means, and to arm and safe said valve means; and environmentally powered safety lock means for preventing motion of said propulsion sensor means, and said exoatmospheric means during ground transportation and storage.

2. An ISAD as recited in claim 1 wherein said exoatmospheric pressure sensor means includes:

an atmospheric reference drive piston assembly operatively supported in said housing;

a solenoid biased port seal pneumatically connected to said reference drive piston assembly;

a vacuum reference drive piston assembly operatively supported in said housing;

a manual spring biased reset vent is operatively disposed in said housing for venting said vacuum drive piston assembly;

an atmospheric drive arm is operatively connected to said atmospheric drive piston;

a vacuum drive arm operatively connects to said vacuum drive piston, said atmospheric drive piston assembly and said vacuum drive piston assemblies are connected to each other by said atmospheric drive arm and said vacuum drive arm respectively;

a timer assembly is operatively positioned on said atmospheric drive arm;

a biased timer release lever pivotally contacts said timer assembly;

an exoatmospheric drive arm shaft is fixedly connected to said atmospheric drive arm;

a pair of exoatmospheric safe and arm output cams are operatively supported on said drive arm shaft;

a biased velocity discriminator member is operatively supported on said drive arm shaft;

a control valve shaft unlock pin operatively engages the first cam of said pair of safe and arm output cams;

a biased drive arm safety lock rotatably contacts one end of said vacuum drive arm;

a transportation lock member rotatably interfaces with said atmospheric drive arm;

an atmospheric reference spring operatively provides a bias for said atmospheric drive arm;

a commit lock member rotatably interfaces with said atmospheric drive arm;

a main valve gear is rotatably mounted on said control valve shaft unlock pin; and a plurality of electrical monitor switches operatively mounted on said exoatmospheric pressure sensor means and said propulsion sensor means, said control valve means and said motor and gear block assembly means indicate the positional status of said valve means, said exoatmospheric sensor means, and said propulsion sensor means.

3. An ISAD as recited in claim 2 wherein said propulsion sensor means includes:

a plurality of parallel spaced rails;

a g-weight which operatively slides on said rails and responds to a boost acceleration of 4 g or greater;

a plurality of bias springs operatively attached to said g-weight, said bias springs being locked in an extended position when said g-weight has received a 4 g or greater impulse for 10 continuous seconds;

drive spring assembly means operatively coupled to said g-weight for storing energy from the translation of said g-weight from an initial position to its full stroke position;

escapement means operatively coupled to said drive spring assembly means for controlling the safety locking of said valve means;

a first spring biased transportation lock rotatably disposed on said g-weight;

a first transportation lock gear for connecting said first transportation lock to said motor and gear block assembly means;

removable second commit lock means for preventing said g-weight from returning to an original position if missile acceleration is sustained for 10 seconds;

a rack fixedly attached to said g-weight; and a biased pinion operatively disposed on said rack rotates in response to said g-weight movement and is coupled to said drive spring assembly means.

4. An ISAD as recited in claim 3 wherein said drive spring assembly means includes:

a spring biased commit lever contacting said second commit lock on one end;

a drive spring commit lever cam slidably coupled to said spring biased commit lever on its other ends;

a drive spring coupled to the pinion shaft of said biased pinion;

a timer output cam coupled to said drive spring;

a biased velocity discriminator lever rotably interfacing with said timer output cam;

a biased time start lever is operatively in alignment with said g-weight and activated thereby upon complete stroke of said g-weight;

60 second timer means coupled to said time start lever, for releasing and regulating the energy stored in said drive spring; and a propulsion safe and arm device output cam operatively connects said timer output cam to said escapement means.

5. An ISAD as recited in claim 4 wherein said pneumatic control valve means includes:

a three way, two position internal pressure sealed valve.

6. An ISAD as recited in claim 5 wherein said motor and gear block assembly means includes:

a D.C. torque motor;

an output pinion gear coupled to said torque motor;

a clutch assembly operatively connected to said output pinion gear;

a differential mechanically coupled to said clutch assembly, said differential including a differential free wheeling output gear;

a transportation brake lever supported by said housing rotatably in alignment with said differential free wheeling output gear;

a differential carrier shaft coupled to said differential;

a valve gear train mechanically coupled to said differential carrier shaft;

a valve brake lever rotatably in alignment with said differential; and a missing link lever mechanically permits said valve gear train to engage and rotate said ball valve from a safe mode to an armed mode.

7. An ISAD as recited in claim 6 wherein said generator means includes;

a gas generator output member having a port pneumatically connected to said ball valve means; and a gas generator interference pin biasedly held in contact with the second cam of said pair of safe and arm output cams.

* * * * *